June 7, 1949.  E. WEISSMAN  2,472,636
APPARATUS FOR PREPARING COFFEE SUBSTITUTES
Filed April 26, 1944
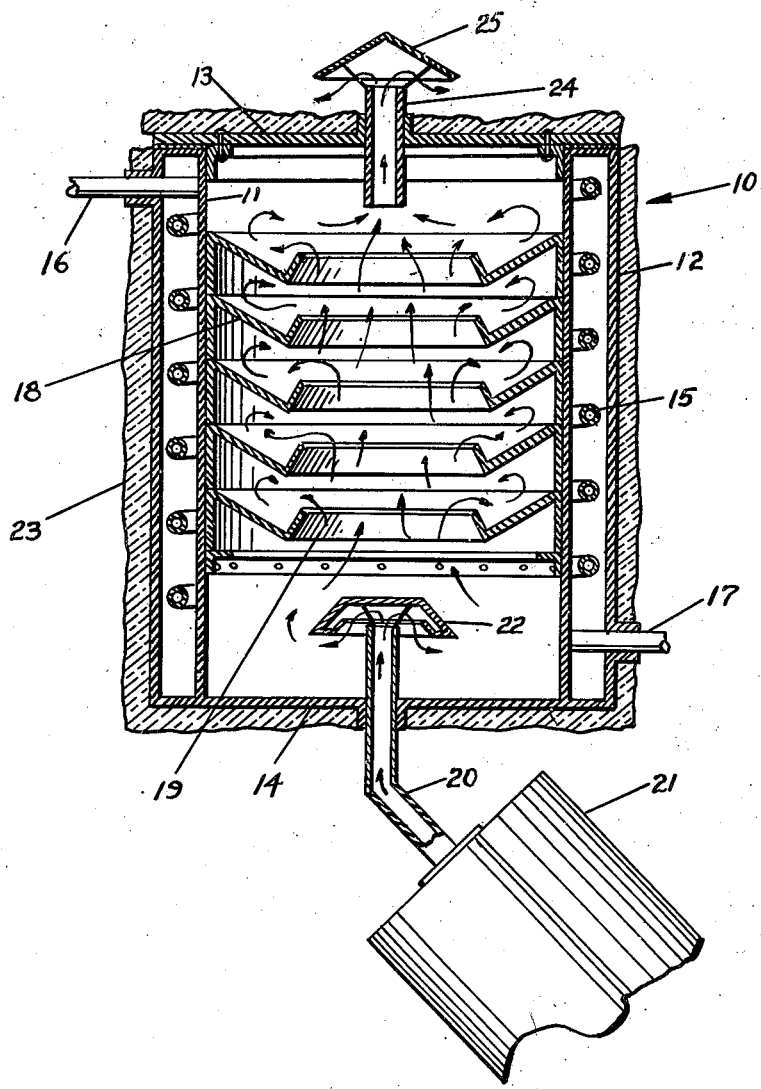
INVENTOR.
EUGENE WEISSMAN
BY
Christian R. Nielsen
ATTORNEY.

Patented June 7, 1949

2,472,636

UNITED STATES PATENT OFFICE 2,472,636

APPARATUS FOR PREPARING COFFEE SUBSTITUTES

Eugene Weissman, Baltimore, Md.

Application April 26, 1944, Serial No. 532,921

3 Claims. (Cl. 99—236)

My invention refers to apparatuses for preparing coffee substitutes, and more particularly, to a type of device that is operated in conjunction with a coffee roasting device.

The object of my invention is to provide a device of the character described, that will permit the saccharification, drying and roasting of the coffee substitute, in the form of grain or vegetable matter, while these substitutes absorb the aromatic organic gases resulting from reducing reactions within the coffee bean during the roasting process. This absorbing process is accomplished by leading the hot aromatic fumes through a tube from the roasting device to a container acting as a condenser, in which the substitute is arranged in trays, and cooling coils within the outer walls of the condenser have a tendency to reduce the temperature of the fumes or gases causing absorption.

The operation of the device will become more apparent as the description proceeds when taken in conjunction with the drawing, wherein the various parts constituting the device are indicated by character references in the form of numerals.

The character 10 shows a cylindrical condenser, consisting of an inner wall 11 and an outer wall 12, forming its sides, and an upper cover 13 and lower end 14, consisting of single plates forming its top and bottom.

The walls 11 and 12 are imperforate, and in order to confine the hot vapors or fumes within the chamber formed by wall 11 and positively preclude entrance thereof into the cooling chamber between walls 11 and 12, the upper ends of such walls are preferably sealed by the unitary plate connection 11', and the lower end plate 14 extends over the lower ends of both walls and has a fluid-tight connection therewith.

There is a cooling coil 15 inserted between the walls 11 and 12. This coil is provided with an inlet 16 and outlet 17 leading to the inside of the compressor.

The inner wall 11 has a plurality of inwardly extending trays 18 angularly disposed and provided with a central aperture 19. These trays 18 are loosely inserted, and are employed for retaining the coffee substitute, such as grain, or vegetable particles.

A tube 20 leading from the roasting device 21, conveys the aromatic fumes from the roaster 21 into the condenser 10 and a distributing plate 22 in the form of a baffle having angularly disposed members extending downward and inward, distributing the fumes so that they pass over the coffee substitute on the trays 18 and permit them to be cooled by the coil 15 through the inner wall 11 of the condenser 10.

Obviously, the outer wall 12 of the condenser 10 may be insulated as shown at 23 and the exhaust fumes are permitted to rise upward out of the condenser 10 through the tubular outlet 24 in the upper cover 13. The tube 24 is shown provided with a protective cap 25.

It is manifest to anyone familiar with the art that the device as shown provides a very inexpensive, yet efficient, means of utilizing the aromatic fumes from the roasting device and affords a means to have these fumes absorbed by the coffee substitute spread on the trays within the condenser.

The trays may be removed individually when the top cover is lifted, and they may be loaded and unloaded without any mechanical change in the device.

In the chosen embodiments of my invention, exemplified by the accompanying drawing, there is shown a specific construction of the device; however, there are many changes in the construction that may be made without effecting the efficiency and function of the device, and I reserve the right to make such changes within the scope of the invention and the appendent claims.

Having thus described my invention, what I claim and desire to receive through Letters Patent from the United States is:

1. Apparatus for condensing the aromatic vapors generated in a coffee roaster and providing for the absorption thereof by a coffee substitute material; comprising a condenser including spaced inner and outer vertically disposed imperforate cylindrical walls, a plate secured to the lower ends of said walls and having a fluid-tight connection therewith and the upper ends of said walls having a fluid-tight plate connection, a removable cover supported by the upper ends of said walls, a cooling coil disposed between said walls and having an inlet and an outlet extending through the outer wall, a plurality of material supporting trays disposed within the inner wall in superposed relation and each provided with a central aperture, a coffee vapor inlet tube extending through said bottom plate and terminating below the lowermost of said trays, and an exhaust tube extending through said cover.

2. The structure according to claim 1, wherein said trays each includes a downwardly and inwardly directed frusto-conical bottom wall, and said bottom wall merging into an upwardly and inwardly directed frusto-conical flange defining said aperture.

3. The structure according to claim 1, wherein said apertures are concentric with said inner wall and are vertically alined, and wherein said vapor inlet and exhaust tubes are vertically alined centrally of said apertures and said vapor inlet tube being provided with a baffle above its free end.

EUGENE WEISSMAN.

REFERENCES CITED

The following references are of record in the file of this patent:

UNITED STATES PATENTS

| Number | Name | Date |
| --- | --- | --- |
| 40,037 | Hoyt | Sept. 22, 1863 |
| 43,354 | Vogel | June 28, 1864 |
| 284,922 | Stutzman | Sept. 11, 1883 |
| 305,953 | Neiman | Sept. 30, 1884 |
| 640,161 | Hesse | Dec. 26, 1899 |

FOREIGN PATENTS

| Number | Country | Date |
| --- | --- | --- |
| 2,114 | Great Britain | May 14, 1881 |
| 15,810 | Great Britain | Oct. 8, 1889 |
| 307,591 | Great Britain | Mar. 14, 1929 |